United States Patent [19]
Lord et al.

[11] Patent Number: 5,251,866
[45] Date of Patent: Oct. 12, 1993

[54] FLEXIBLE COVERSTOCK SEMI-RIGID FOAM VOID TEST MOLD

[75] Inventors: Ellen Lord, S. Berwick, Me.; Brian VanBenschoten, East Rochester, N.H.; Daniel Durand, Berwick, Me.

[73] Assignee: Davidson Textron Inc., Dover, N.H.

[21] Appl. No.: 779,813

[22] Filed: Oct. 21, 1991

[51] Int. Cl.$^5$ .............................................. B22D 19/00
[52] U.S. Cl. .................................... 249/64; 249/83; 249/121; 249/125; 249/176; 249/DIG. 4
[58] Field of Search ............... 249/64, 83, 121, 122, 249/125, 142, 176, DIG. 4; 425/4 R, 127, 817 R

[56] References Cited

U.S. PATENT DOCUMENTS

| | | | |
|---|---|---|---|
| 1,787,503 | 1/1931 | Zube | 249/142 |
| 1,873,508 | 8/1932 | Tanger | 249/121 |
| 2,615,202 | 10/1952 | Talalay | 249/142 |
| 2,752,635 | 7/1956 | Miller | 249/176 |
| 2,797,442 | 7/1957 | Wagner | 249/125 |
| 3,384,335 | 5/1968 | Schwarz | 249/176 |
| 4,552,716 | 11/1985 | Habish | 249/142 |
| 4,661,391 | 4/1987 | Schröder et al. | 425/127 |
| 4,759,700 | 7/1988 | Onnenberg et al. | 425/127 |
| 4,793,784 | 12/1988 | Belleville et al. | 425/127 |
| 4,806,088 | 2/1989 | Busch et al. | 425/127 |
| 4,806,094 | 2/1989 | Rhodes, Jr. et al. | 425/127 |
| 4,936,762 | 6/1990 | Gaudreau et al. | 249/176 |

FOREIGN PATENT DOCUMENTS

| | | | |
|---|---|---|---|
| 234371 | 8/1960 | Australia | 249/176 |
| 862705 | 3/1961 | United Kingdom | 249/176 |
| 1043961 | 9/1966 | United Kingdom | 249/176 |

*Primary Examiner*—Jay H. Woo
*Assistant Examiner*—Robert B. Davis
*Attorney, Agent, or Firm*—Reising, Ethington, Barnardy, Perry & Milton

[57] ABSTRACT

A test mold assembly for evaluating the surface deformation tendency of a coverstock bonded to a reactive plastic formulation to voids in the formulation including a base adapted to support a coverstock and spaced side walls extending upwardly from the base to define a mold cavity for receiving foam precursors. The assembly further includes a lid adapted to form the top of the mold cavity and having a cover portion disposed spaced from the base. The lid includes a plurality of integral projections extending downwardly from the cover portion into the mold cavity a predetermined distance to create voids in the foam. A method of making a foam void model for evaluating the surface deformation tendency of a coverstock bonded to a reactive plastic formulation to voids in the formulation is also disclosed.

2 Claims, 3 Drawing Sheets

FLEXIBLE COVERSTOCK SEMI-RIGID FOAM VOID TEST MOLD

BACKGROUND OF THE INVENTION (1.) Technical Field

The subject invention is directed toward a test mold for use in reactive injection or conventional type molding operations and, more specifically, to test molds adapted to produce molded parts having simulated voids therein for evaluating the effect of these voids on the surface appearance of the coverstock.

(2) Description Of The Prior Art

Reaction injection molding processes are well known in the prior art and are extensively employed, for example, to bond a polyvinyl chloride coverstock to a foam base portion, which, in turn, is usually supported by a support structure. Reaction injection molding processes of this type are commonly used in the manufacture of instrument panels.

One parameter which is important to the manufactures of such products is the appearance of the coverstock when bonded to the foam. During the molding process, voids in the foam can form which produce irregularities on the coverstock or otherwise effect the surface appearance of the coverstock. As such, it is important to study this phenomena.

One method of studying the effects on the coverstock caused by voids in the foam employed in the past was to identify defective parts during the course of manufacturing the product using regular quality control procedures and then environmentally cycling the parts and analyzing the effects of these tests on the parts. Unfortunately, it is difficult to identify defective products having voids in the foam because they are not visible upon sight inspection. This method was therefore unpredictable. Furthermore, reliance upon production run instrument panels or other products as a source of test models was expensive.

These problems were addressed by the test mold disclosed in U.S. Pat. No. 4,936,762 issued to Gaudreau et al on Jun. 26, 1990 and assigned to the assignee of the subject invention. The test mold disclosed in this patent has various sized, spaced apart, aligned openings formed in each of the front and rear walls of the mold, but with the centers thereof at different elevations in their respective front and rear walls. Removable rods inserted through the aligned mold wall openings produce longitudinal openings through the part which is molded around the rods permitting the effect thereof on the surface of the molded part to be evaluated. In this way, a foam model having voids therein could be manufactured under controlled conditions and scientifically tested without the cost associated with special quality control procedures and scrapping production part.

Although eliminating some of the problems of the prior art set forth above, the test mold of the '762 patent was deficient in that the voids created by the rods did not accurately model the voids typically found in production parts. More specifically, the geometry of voids typically found in production parts most closely approximate an ellipse having a major and minor axis. The rods of the Gaudreau et al test mold are cylindrical in shape and have a circular cross section. Furthermore, in order to vary the geometry of the voids created in the foam, both the rods and the openings in the side walls must be changed. As such, the realities of this situation dictate that a different test mold be made for each void geometry to be investigated.

The subject invention overcomes the problems associated in the prior art and addresses the deficiencies of the '762 patent in an efficient, cost effective flexible coverstock semi rigid foam void test mold and method of making a foam void model.

SUMMARY OF THE INVENTION AND ADVANTAGES

The subject invention is directed toward a test mold assembly for evaluating the surface deformation tendency of a coverstock bonded to a reactive plastic formulation to voids in the formulation including a base adapted to support a coverstock and spaced side walls extending upwardly from the base to define a mold cavity for receiving foam precursors. The assembly further includes a lid adapted to form the top of the mold cavity and having a cover portion disposed spaced from the base. The lid includes a plurality of integral projections extending downwardly from the cover portion and into the mold cavity a predetermined distance to create voids in the foam.

The subject invention overcomes the problems associated in the prior art in a test mold which is specifically adapted to produce a test foam void model having a coverstock bonded thereto and which includes voids of a predetermined size and length formed in the foam. Furthermore, the effect of voids having various geometrical shapes can be tested by simply interchanging lids having projections of various geometrical shapes.

BRIEF DESCRIPTIONS OF THE DRAWINGS

Other advantages of the present invention will be readily appreciated as the same becomes better understood by reference to the following detailed description when considered in connection with the accompanying drawings wherein.

Figure 5:
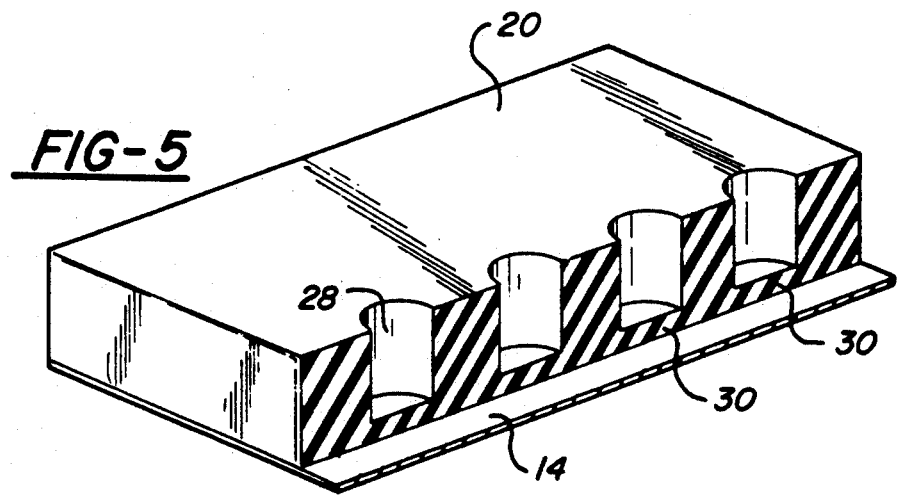
Figure 6:
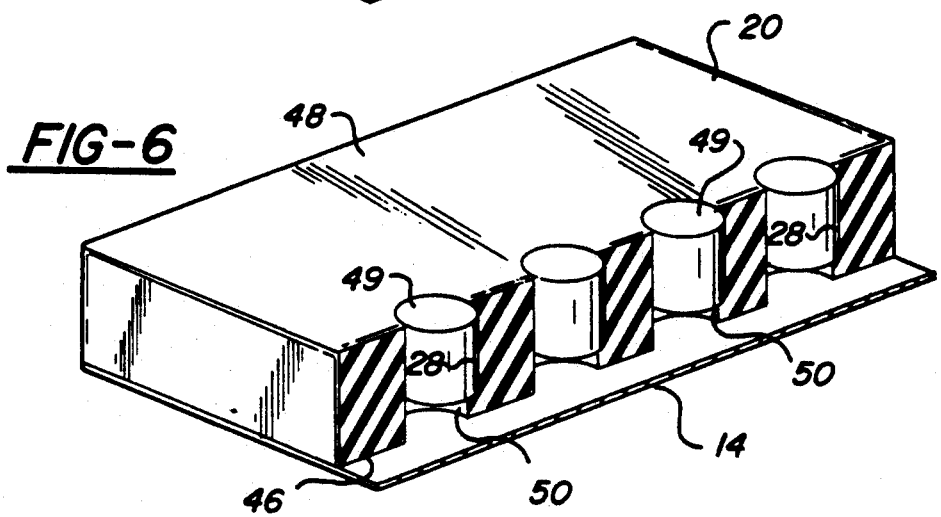

FIG. 5 is a perspective view of a partially cut away foam product of the subject test mold having voids extending a predetermined distance into the foam block and presenting foam gaps between the void and the coverstock; and FIG. 6 is a perspective view of a foam product of the test mold of the subject invention partially cut away and showing voids extending completely through the foam block with plugs disposed in the voids.

DETAILED DESCRIPTION OF THE PREFERRED EMBODIMENT AND BEST MODE FOR CARRYING OUT THE INVENTION

Figure 1:
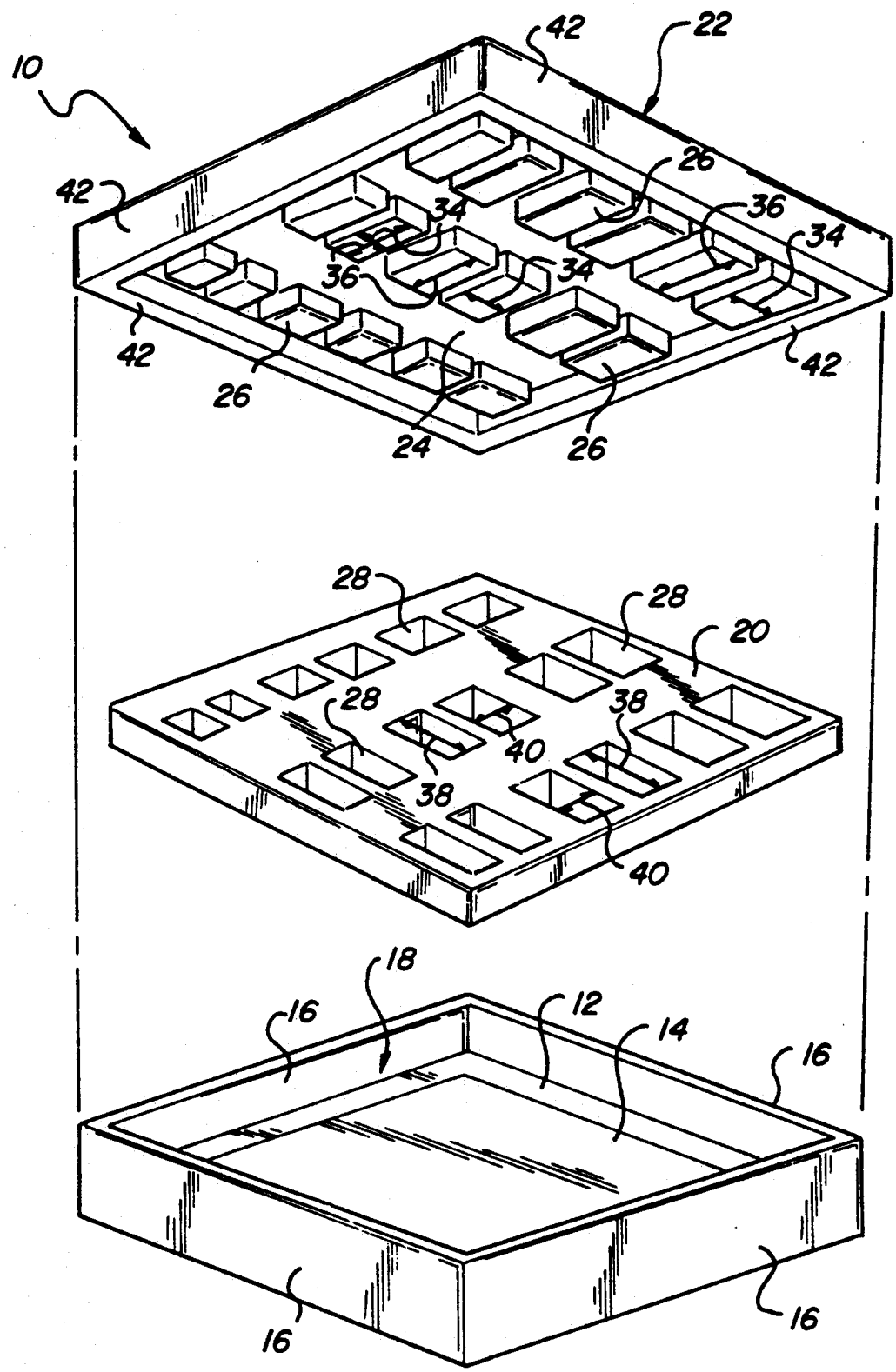
FIG. 1 is a perspective view of the flexible coverstock semi-rigid foam void test mold of the subject invention illustrating the lid having integral projections.
Figure 3A:
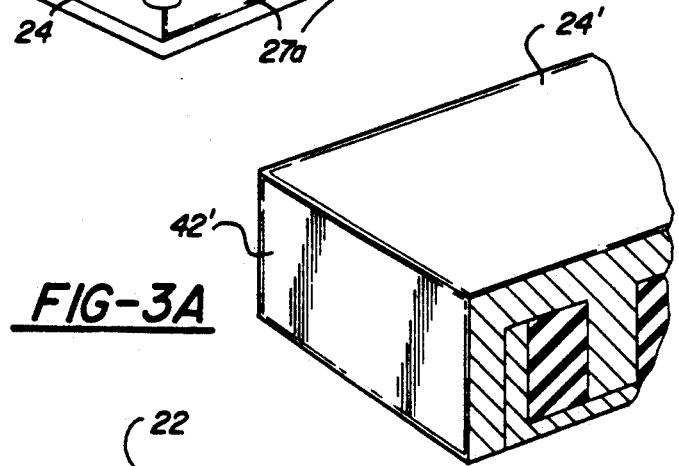
FIG. 3A is a cross-sectional side view of a test mold illustrating the cover stock bonded to the foam wherein the cover of the lid has extending side portions.
Figure 3:
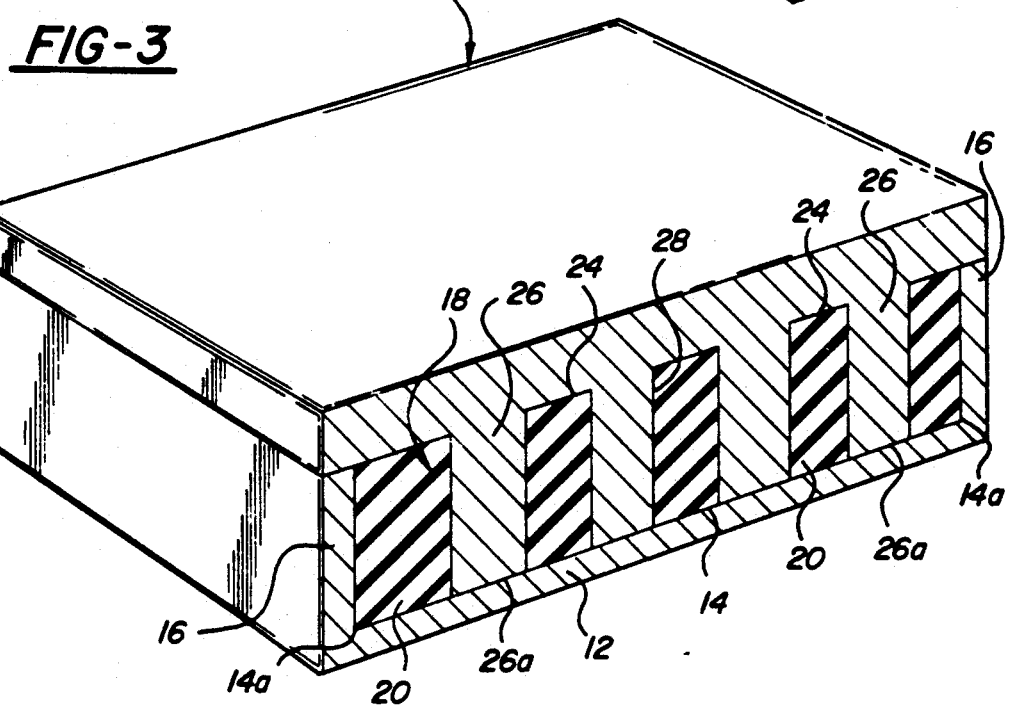
FIG. 3 is a cross-sectional side view of a flexible coverstock semi-rigid foam void test mold illustrating the cover stock bonded to the foam.
Figure 4:
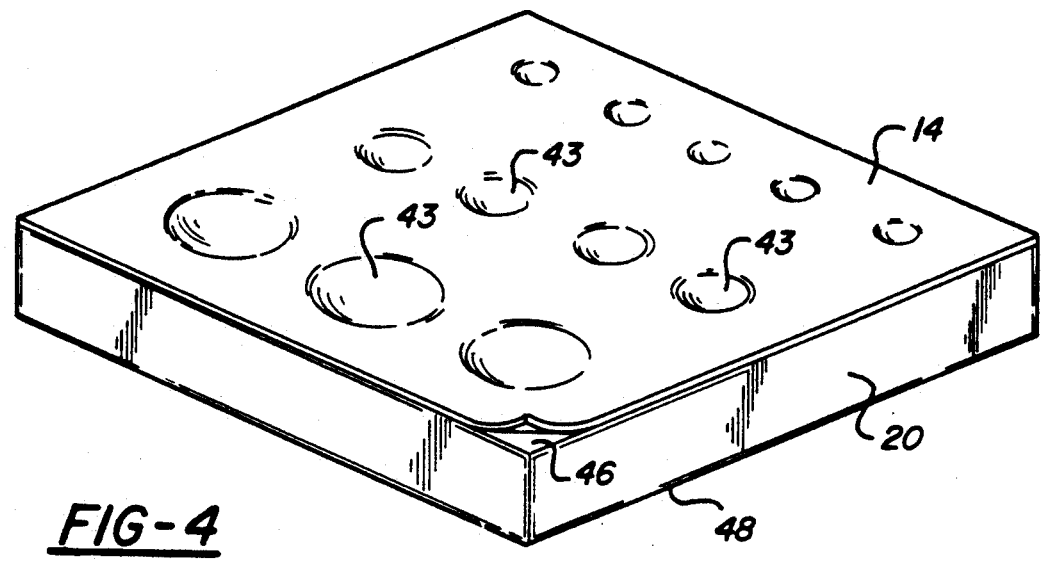
FIG. 4 is a perspective view of a product of the test mold of the subject invention illustrating the surface deformation in the coverstock caused by the voids in the foam.

A test mold assembly for evaluating the surface deformation tendency of a coverstock bonded to a reactive plastic formulation to voids in the formulation is generally indicated at 10 in FIG. 1. For purposes of description only and not by way of limitation, the subject invention will be described in connection with a mold process wherein a vinyl skin shell is bonded to a foam base so as to simulate, for example, a portion of a instrument panel. The assembly 10 includes a base 12 adapted to support a coverstock 14 and spaced side walls 16 extending upwardly from the base 12 to define a mold cavity 18 for receiving foam precursors to form a foam block 20. The coverstock 14 may be of any thermoplastic conventionally employed on products such as instrument panels including polyvinyl chloride, vacuum formed polyvinyl chloride-acrylonitrile-butadene-styrene or any other thermoplastic commonly known in the art. Alternatively, the coverstock may be comprised of nonsynthetic materials including cloth, leather or the like. As shown in FIG. 4, the coverstock member 14 is a continuous sheet. The sidewalls 16 abut against outer edges 14a of the coverstock member 14, as shown in FIG. 3. The foam precursors may be of the type commonly employed in reaction injection moldings such as a conventional low pressure polyurethane composition which is poured into the mold cavity 18.

The assembly further includes a lid, generally indicated at 22, adapted to form the top of the mold cavity 18 and having a cover portion 24 disposed spaced from the base 12. The lid 22 includes a plurality of integral projections 26 covered with a suitable release coating and extending downwardly from the cover portion 24 into the mold cavity 18 a predetermined distance to create voids 28 in the foam 20. More specifically, and as best shown in FIG. 5, the length of the integral projections 26 may be varied so as to present a foam gap 30 disposed between the voids 28 created by the projections 26 and the cover stock 14 in the foam block 20 created by the test mold.

Alternatively, and as shown in FIG. 3, the projection 26 may extend the entire distance between the cover 24 and the base 12 across the mold cavity 18 such that the voids 28 created by the projections 26 span the entire distance between the cover 24 and the coverstock 14.

Figure 2:
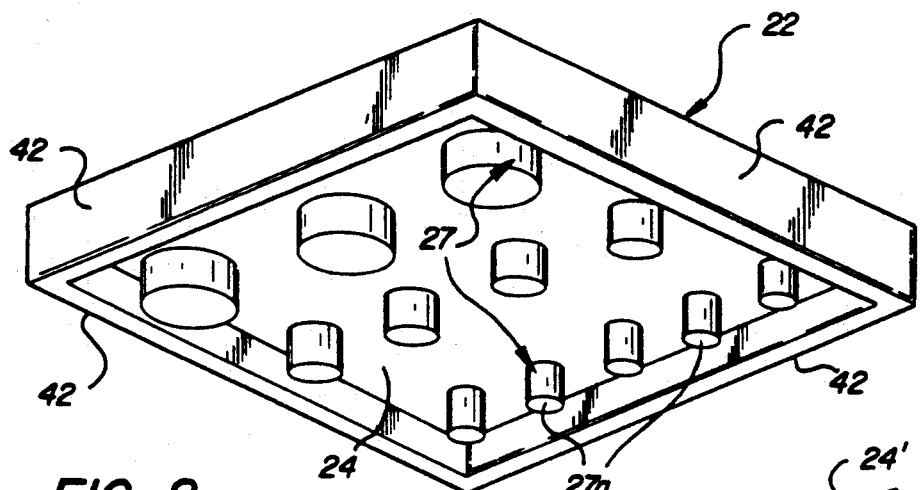
FIG. 2 is a perspective view of a lid for the test mold having integral projections of a different geometrical shape then those shown in FIG. 1.

It has been determined that the voids most commonly created in the foam during production are elliptical in shape and are defined by a major and minor axis. In order to more closely model voids actually created in production, the projections 26 of one preferred embodiment of the subject invention have a geometric shape defined by a major and minor axis 34, 36, respectively as shown in Figure to create voids 28 having corresponding major and minor axes 38, 40, respectively. However, the cost of manufacturing a test mold with projections which are elliptical in shape is prohibitive. Accordingly, the projections 26 of one embodiment of the subject invention may be rectangular in shape and defined by major and minor axis 34, 36. The rectangular shape projections 26 approximate the shape of a ellipse which, in turn, closely model the shape of the voids created in production without the attendant cost of manufacturing test molds having elliptical projections. Alternatively, and as shown in FIG. 2, the lid 22 may include cylindrical projections 27 of various length and having circular cross sections of various diameters. Furthermore, the test mold of the subject invention may employ projections having any other geometrical shape with any number of various sizes. As shown in FIGS. 2 and 3, predetermined ones of the projections 26, 27 have planar surfaces 26a and 27a located in a common plane that extends across the inner surface 14a of the continuous sheet coverstock material 14. The planar surfaces 26a, 27a overlie the continuous sheet coverstock member and when the cover is removed from the base, thereby form foam voids at the inner surface 14a at locations corresponding to the locations where the planar surfaces 26a, 27a engage the inner surface 14a during curing of foam precursors within the mold cavity.

The cover 24 of the lid 22 includes spaced downwardly extending side portions 42 corresponding to the side walls 16 of the mold cavity 18 and which are adapted to be disposed in overlapping side by side relation relative to the side walls 16 to seal the mold cavity.

A foam block 20 made by the test mold of the subject invention with a thin vinyl coverstock 14 bonded thereto and having voids 28 formed therein can then be subjected to a battery of tests to determine the tendency of the voids 28 to cause surface deformations 43 in the coverstock 14 as shown in FIG. 4.

The method of making a foam void test model for evaluating the surface deformation tendency of a coverstock mounted to a reactive plastic formulation to voids in the formulation includes the steps of forming a foam block 20 defining at least a pair of surfaces 46, 48 disposed in spaced relation relative to one another with a thin layer of vinyl skin coverstock 14 attached to one surface 46 of the foam block 20. The foam block 20 has a plurality of voids 28 extending through the block 20 and between the spaced surfaces 44, 46. The method further includes the steps of positioning a plurality of plugs 49 in the voids 28 and adjusting the plugs 49 to present gaps 50 of various predetermined distances between the plugs 48 and the coverstock 14. The foam block 20 is then environmentally cycled to evaluate the deformation tendency of the vinyl coverstock 14 relative to the foam having voids therein. More specifically, the environmentally cycling tests simulate the environments to which, for example, dashboards or instrument panels are subjected. Examples of such tests are heat/age tests, xenon, ultraviolet sun simulator tests and other tests wherein the instrument panel is cycled between hot and cold environments.

The invention has been described in an illustrative manner and it is to be understood that the terminology which is used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

We claim:

1. A test mold assembly for evaluating the surface deformation tendency of a flexible coverstock bonded to a semi-rigid plastic formulation comprising:
   a continuous sheet of flexible coverstock material;
   a base member having a surface thereon supporting said continuous sheet of flexible coverstock material and defining a mold cavity for receiving foam precursors for bonding to said continuous sheet of flexible coverstock material;

a cover member connectible to said base member for closing said mold cavity; a plurality of rectangular blocks having first and second ends thereon; said first ends connected to said cover member and said second ends engaged with said continuous sheet of flexible coverstock material;

said cover member and said rectangular blocks being releasable from said base member and said flexible coverstock material following curing of said foam precursors for forming a plurality of spaced rectangular holes extending through said cured foam for creating voids in the cured foam at said flexible coverstock material having a shape that closely models the shape of foam voids created in the production of foam material having a flexible coverstock bonded thereto.

2. The test mold assembly set-forth in claim 1, further comprising said second ends located in a flat plane; said surface being a flat two-dimensional surface and said flexible coverstock material supported thereon being a flat member having an inner surface located in said flat plane.

* * * * *